Patented Dec. 9, 1952

2,621,194

UNITED STATES PATENT OFFICE 2,621,194

POLYMERIC HYDROXYL - CONTAINING TITANIUM CARBOXYLATES AND METHODS FOR PREPARING SAME

Joseph H. Balthis, Mendenhall, Pa., assignor to E. I. du Pont de Nemours and Company, Wilmington, Del., a corporation of Delaware No Drawing. Application July 26, 1950, Serial No. 176,056

12 Claims. (Cl. 260—414)

This invention relates to new organo-soluble polymeric hydroxyl-containing titanium carboxylates of polytitanyl carboxylates and to novel methods for preparing such compounds.

More particularly, the invention relates to the preparation of novel polymeric hydroxyl-containing titanium mono- and sesqui-carboxylates which are relatively moisture-stable and highly soluble in hydrocarbons, ethers, and chlorinated hydrocarbons.

In accordance with the invention, the polymeric hydroxyl-containing titanium carboxylates are prepared by reacting a titanium tetrahalide, a long-chain aliphatic monocarboxylic acid containing from 8-20 carbon atoms, and a controlled amount of water.

In a more specific and preferred embodiment, the invention comprises reacting in the presence of a suitable acid acceptor titanium tetrachloride and a long-chain aliphatic monocarboxylic acid containing from 8-20 carbon atoms, such as stearic acid, at least 1 mol of water per mol of the original titanium tetrachloride, and thereafter isolating the resulting organo-soluble polymeric hydroxyl-containing titanium carboxylate from the reaction mixture.

In one practical and preferred adaptation of the invention, an anhydrous suspension of a long-chain aliphatic monocarboxylic acid, such as stearic acid, in a suitable hydrocarbon solvent, is mixed for reaction with an inorganic titanium tetrahalide, preferably titanium tetrachloride. From 1-2 mols of water per mol of the $TiCl_4$ employed are then incorporated in the reaction mixture and the mass is then allowed to stand overnight at room temperature in the presence of an acid acceptor, such as triethylamine. The resulting polymeric hydroxyl-containing titanium carboxylate is then recovered in a conventional manner from the reaction products, and comprises a viscous liquid or low-melting wax, which is readily soluble in organic solvents such as chloroform, benzene, toluene, xylene. These solutions possess highly desirable surface-active properties to become adaptable for use in a wide variety of commercial applications. My novel products are particularly useful as dispersants for carbon in kerosene and as dispersing agents for various organic and inorganic pigments.

To a clearer understanding of the invention, the following illustrative examples are given:

*Example I*

Five hundred twenty-eight grams (1.86 mols) of stearic acid were suspended in 3000 cc. of n-heptane and 184.1 grams of triethylamine were added. The resulting yellow solution was cooled in an ice bath and 172.6 grams of $TiCl_4$ (0.9097 mol) were added dropwise, with stirring. The mixture was allowed to stand over night at room temperature. Additional triethylamine (184.1 grams) was added, followed by 16.38 grams of water (0.9097 mol). n-Heptane (500 cc.) was added to reduce viscosity, and the thick mixture was stirred for 16½ hours on a steam bath. Triethylamine hydrochloride was removed by filtration. Passage of dry air through the filtrate lightened its color. Poly(titanyl stearate) was recovered by removing n-heptane in vacuo on a steam bath. Additional poly(titanyl stearate) was obtained by extracting the precipitate of triethylamine hydrochloride with dry n-heptane. A portion (360.2 grams) of the stearate was melted and extracted with acetonitrile in a liquid-liquid extractor at 67° C. In the first 21 hours 61.4 grams of titanium-free solid were removed by the acetonitrile. In the next 72 hours 19.7 grams were removed, and in the final 48 hours 3.2 grams were removed. The product which remained after these extractions was a waxy solid which was soluble in petroleum ether at ordinary temperatures to the extent of at least 40% by weight. It corresponded to a polymeric hydroxy sesquistearate having the formula:

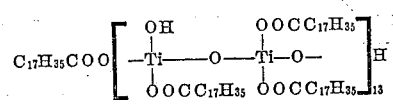

|  | Calc. | Found |
|---|---|---|
| Ti _____percent__ | 9.44 | 9.65, 9.61, 9.51, 9.44 |
| C _____do____ | 65.60 | 65.60, 65.74 |
| H _____do____ | 10.53 | 10.55, 10.77 |
| N _____do____ | 0.0 | 0.12, 0.12 |
| Cl _____do____ | 0.0 | 0.03, 0.07 |
| Mol. Wt._____ | 13,187 | 13,900, 13,400 |

Mol. wt. was determined by elevation of the boiling point of benzene.

Example II

Twenty-five cc. (0.2274 mol) of titanium tetrachloride were added to a stirred solution of stearic acid (129.4 grams, 0.4549 mol) in 600 cc. of n-heptane. This afforded a black solution to which 4.09 grams (0.2274 mol) of water were added dropwise after about 20 minutes. Hydrogen chloride was evolved rapidly, the mixture lightened in color, and a small amount of precipitate formed. The mixture was refluxed for 6½ hours though relatively little hydrogen chloride was evolved during the last 5 hours. Insoluble material (2.5 grams) was removed by filtration, and n-heptane was separated by distillation in vacuo (steam bath). The product was a low-melting, gray-brown solid which weighed 142.2 grams and which gave 11.07% $TiO_2$ on ignition. It was pulverized and stirred with three 600 cc. portions of dry acetone. The material removed by these extractions was Ti-free and weighed 23.2 grams, 8.1 grams, and 6.1 grams, respectively. The dried product weighed 100.6 grams and gave 15.51% $TiO_2$ on ignition. An 88-gram portion was placed in a liquid-liquid extractor and further extracted with acetonitrile at 78–80° C. In the first 72 hours of extraction, 37.1 grams of Ti-free material was extracted; and in the second 96 hours, 0.9 gram. The thoroughly-extracted titanium stearate was soluble in benzene and gave 26.35% $TiO_2$ on ignition, thus contained less stearate than required for a monostearate.

Example III

Two hundred sixty-four grams (0.9279 mol) of stearic acid were suspended in 900 cc. of n-heptane, and triethylamine (92.05 grams, 0.9097 mol) was added with stirring. This gave a clear solution. Titanium tetrachloride (50 cc., 0.4548 mol) was added dropwise, and the mixture was stirred on a steam bath for 1½ hrs. Water (8.19 grams, 0.4548 mol), triethylamine (92.05 grams, 0.9097 mol), and n-heptane (450 cc.) were then added and in the order named, and the viscous slurry was stirred for 13 hrs. on a steam bath. Triethylamine hydrochloride (267.9 grams) was filtered off, and n-heptane was removed from the combined filtrate and n-heptane washings by heating in vacuo on a steam bath. The product solidified on cooling to a tan solid which weighed 260.3 grams. It was extracted batchwise with two 500-part portions of acetone. The first extraction removed 15.8 grams of Ti-free solid; the second, 8.6 grams of Ti-free solid. The product, melting at 54–55° C., was a distearate having the empirical formula $$C_{180}H_{352}O_{26}Ti_5$$

This corresponds to the structure:

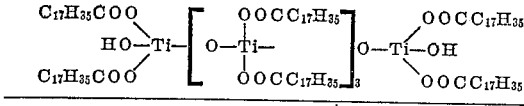

|  | Calc. | Found |
| --- | --- | --- |
| Ti percent | 7.55 | 7.67, 7.66 |
| C do | 68.15 | 67.87, 67.96 |
| H do | 11.19 | 11.30, 11.07 |
| Mol. Wt | 3,172 | 3,060, 3,140 |

Neither the melting point nor the titanium content of the product was appreciably changed by two recrystallizations from petroleum ether.

Example IV

One hundred twenty-nine and four-tenths grams (0.4548 mol) of a solution of stearic acid and 25 cc. (0.2274 mol) of $TiCl_4$ in 700 cc. of toluene was refluxed for 8 hrs. Analysis showed that about one-half of the original halogen was thereby expelled as hydrogen chloride. Water (4.09 grams, 0.2274 mol) and triethylamine (46.03 grams, 0.4548 mol) were added, and the slurry was stirred on a steam bath for 11 hrs. Triethylamine hydrochloride (56.7 grams) was filtered off, and the product (143.6 grams, Ti content of 7.27%) was isolated by removing toluene in vacuo. Portions of the product were extracted in several ways:

(a) One batch extraction with acetone at room temperature removed 7.4% by weight of Ti-free solid. Re-extraction removed 6.4% by weight of Ti-free solid. Undissolved solid contained 7.94% Ti.

(b) Forty-two hours of continuous extraction with acetone at room temperature removed about 15% by weight of Ti-free solid and left material containing 8.35% Ti.

(c) Fifty hours of extraction with acetonitrile in a Soxhlet apparatus removed 21% by weight of Ti-free solid and left material containing 8.86% Ti.

Example V

One mol of $TiCl_4$ was added to an n-heptane solution of 2 mols of lauric acid and 2 mols of triethylamine. After a period of reaction, 1 mol of water and 2 mols of triethylamine were added. The product isolated in almost theoretical yield in the manner previously described was a dark oil.

A portion of the product (94.8 grams) was extracted for 160 hrs. with acetonitrile at 77–80° C. The liquid product is a sesquicarboxylate having the empirical formula $C_{540}H_{584}O_{74}Ti_{16}$ which corresponds to the structure:

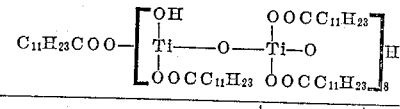

|  | Calc. | Found |
| --- | --- | --- |
| Ti percent | 12.48 | 13.38, 12.49 |
| C do | 58.66 | 59.09, 59.18 |
| H do | 9.59 | 9.88, 9.66 |
| Mol. Wt | 6,142 | 6,130, 6,220 |

Example VI

Lauric acid (273.4 grams, 1.365 mols) was dissolved in 500 cc. of toluene, 50 cc. (0.455 mol) of $TiCl_4$ was added, and the mixture was refluxed for 4 hrs. thereby eliminating 66.6% of the original chlorine. Water (8.19 grams, 0.455 mol) was dissolved in 61.53 grams of triethylamine by cooling and the solution added dropwise. The mixture was stirred on a steam bath for 2¼ hours and allowed to stand over the week-end at room temperature. Triethylamine hydrochloride was separated by filtration and toluene was removed in vacuo. The product was a brown oil at steam bath temperature and a paste at room temperature which weighed 275.6 grams. It had a Ti content of 6.51%. Continuous liquid-liquid extraction with acetonitrile at room temperature of a portion removed 30.5% by weight of Ti-free solid and left an oil containing 9.96% Ti. This analysis corresponds approximately to that of a polymeric hydroxyl containing dilaurate.

Example VII

Lauric acid (91.1 grams, 0.4548 mol) was dissolved in 700 cc. of toluene, 92.03 grams of triethylamine (0.9096 mol) were added, and the mixture cooled in an ice bath. After adding 25 cc. (0.2274 mol) of TiCl₄ with cooling and stirring, the black mixture was allowed to stand at room temperature for 67 hrs. A precipitate was observed after the dark solution had been heated 9 hrs. on a steam bath. Water (8.19 grams, 0.4548 mol) was added, and the slurry was stirred on a steam bath for 12 hrs. Color lightened gradually; dried air caused an immediate change from green-black to orange. One hundred twenty-two and four-tenths grams of triethylamine hydrochloride were separated by filtration, and 97.6 grams of a soft, wax-like product was recovered by removing toluene in vacuo. Extraction with hot acetonitrile in a liquid-liquid extractor removed 41% by weight of Ti-free solid. The purified benzene-soluble wax-like product had a titanium content of 17.23% (calculated for

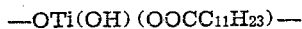

17.08%).

While the foregoing examples illustrate certain specific and preferred embodiments of the invention, it will be understood that variance therefrom can be resorted to without departing from its underlying spirit and scope. Thus, although titanium tetrachloride, due to its low cost and commercial availability, comprises a preferred type of titanium halide reactant herein, other titanium halides, such as the tetrabromide, tetraiodide, and tetrafluoride, can also be used and hence are contemplated for employment.

Similarly, any aliphatic monocarboxylic acid containing from 8 to 20 carbon atoms can be used as a reactant for preparing the polymeric hydroxyl-containing titanium carboxylates of this invention, specific examples of which include caprylic, capric, lauric, dodecanoic, myristic, palmitic, stearic, arachidic, crotonic, drying oil fatty acids, dodecenoic, oleic, oleosteric, linoleic, linolenic acids, and the like. Any desired quantity of carboxylic acid may be used, although not more than two mols per mol of titanium tetrahalide can enter into the desired reaction. Amounts above two mols per mol of titanium tetrahalide are undesirable since such amounts function to contaminate the ultimate product.

For practical reasons, it is frequently desirable to carry out the reaction between the titanium tetrahalide and the aliphatic monocarboxylic acid in the presence of an inert, anhydrous, volatile organic solvent, such as benzene, toluene, xylene, cyclohexane, hexane, heptane, carbon tetrachloride, methylene chloride, etc.

In order to utilize the titanium tetrahalide most effectively, the reaction between the titanium tetrahalide and carboxylic acid is preferably conducted under anhydrous conditions with the hydrolysis step being effected subsequently. Following water addition, the reaction mixture is usually heated to about 80° C., or above, and until substantially all halogen has been expelled as hydrogen halide or precipitated as the hydrohalide of the acid acceptor. This may consume a time period of from 1 to 16 hrs.

As already noted, at least one mol of water is required per mol of original titanium halide. Preferably not more than two mols of water are used per mol of original titanium halide, if loss of titanium tetrahalide is to be avoided. Once formed, the polymeric hydroxyl-containing titanium carboxylates are resistant to hydrolysis and retain their organic solubility, though undergoing some hydrolysis, even when heated with boiling water.

The ratio of titanium tetrahalide, acid, and water used will be found to determine the composition of the polymeric hydroxyl-containing titanium carboxylate formed, i. e. the ratio of titanium to carboxylate to hydroxyl in the ultimate product and also its molecular weight.

The order of admixture of the titanium tetrahalide and carboxylic acid is not critical. Mixing is preferably effected between 0° C. and 60° C. in order to minimize charring and permit control of the rate of reaction. If desired, however, higher or lower temperatures can be used.

By suitable adjustment of the temperature after mixing, for example by operating at 100° C. to 180° C. for from 1 to 8 hrs. or more, it is usually possible to expel hydrogen halide equivalent to the quantity of carboxylic acid added. Irrespective of the quantity of acid added, however, it is difficult to expel more than 3 mols of hydrogen halide per original mol of titanium tetrahalide. Following expulsion of the hydrogen halide, the desired quantity of water may be added at any desired temperature. After addition of the water, it is preferable to add a quantity of a suitable acid acceptor stoichiometrically equivalent to the residual halogen, rather than to rely on heat to expel the remainder of the hydrogen halide. Suitable acid acceptors include triethylamine, pyridine, quinoline, etc. Irrespective of whether or not acid acceptor is used, the mixture is heated, preferably at 80° C. to 150° C. for from 1 to 16 hours to complete the reaction. It is not necessary to expel hydrogen halide prior to addition of the acid acceptor; in this case the acid acceptor is added in amount stoichiometrically equivalent to the halogen in the titanium halide after addition of the carboxylic acid or water. Since the acid acceptor may react with unconverted titanium tetrachloride, it is preferably added after the addition of equivalent quantities of carboxylic acid or carboxylic acid and water. Alternatively, the acid acceptor may be allowed to react with an equivalent quantity of carboxylic acid, preferably in solution, prior to addition of the titanium tetrahalide. When an acid acceptor is used, it is best to operate in an anhydrous organic medium, such as toluene or n-heptane, in which the hydrohalide of the acid acceptor is insoluble. The precipitated hydrohalide salt may then be separated by filtration and the polymeric hydroxyl-containing titanium carboxylate isolated by distilling off solvent, preferably under reduced pressure.

The examples have illustrated removal of excess reactants and by-products from the polymeric hydroxyl-containing titanium carboxylates by fractional extraction with acetonitrile or acetone. In place of acetone or acetonitrile, other inert organic solvents can be used. As an alternative to extraction, by-products and excess reactants can be removed by vacuum distillation. Another alternative is to dissolve the polymeric hydroxyl-containing titanium carboxylate in a suitable solvent such as benzene and then reprecititate it in a non-solvent, such as cold acetone.

Although the exact composition of the hydroxyl-containing titanium carboxylates is not definitely known, it is believed that their formation is represented by the following equations, which also show how composition may vary with the ratio of the reactants employed:

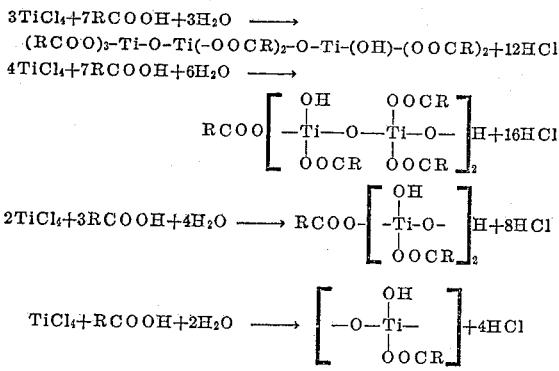

3TiCl₄+7RCOOH+3H₂O ⟶
  (RCOO)₃-Ti-O-Ti(-OOCR)₂-O-Ti-(OH)-(OOCR)₂+12HCl
4TiCl₄+7RCOOH+6H₂O ⟶
  RCOO[-Ti(OH)(OOCR)-O-Ti(OOCR)₂-O-]₂H+16HCl
2TiCl₄+3RCOOH+4H₂O ⟶ RCOO-[-Ti(OH)(OOCR)-O-]₂H+8HCl
TiCl₄+RCOOH+2H₂O ⟶ [-O-Ti(OH)(OOCR)-]+4HCl

Although the above equations illustrate the preparation of mono- and dicarboxylates, it will be understood that both degree of carboxylation and molecular weight are subject to wide variation.

The polymeric hydroxyl-containing titanium carboxylates of this invention vary from viscous liquids to soft wax-like bodies. They are characterized by their high solubility in organic solvents such as ethers, esters, hydrocarbons, chlorinated hydrocarbons, etc., and such solutions function as dispersants for carbon black, pigments, and the like.

Their effectiveness as dispersing agents for pigments is illustrated by the following:

Solutions were prepared of 1 gram of the hydroxy poly(titanyl stearate) of Example I in 100 cc. of kerosene. Flowable dispersions resulted when 10 cc. portions of the solutions were stirred with 10 grams of carbon black. In the absence of the polymeric hydroxy titanyl stearate the dispersions were non-flowable. Similar results were obtained with the hydroxyl-containing titanium carboxylates of Examples II and III.

The surface activity of the hydroxyl-containing polymeric titanium carboxylates is also reflected in their ability to disperse low concentrations of carbon black. This is illustrated below:

Ten grams of a paste prepared by pebble milling 30 g. of carbon black with 400 g. of white oil was placed in a 4 oz. bottle which was filled to its shoulder with kerosene containing 0.2 g. of a hydroxyl - containing poly(titanyl stearate) analyzing 9.55% Ti, prepared by the procedure described in Example I, and the mixture agitated. After 15 days standing at room temperature there was no visual evidence of settling of the carbon black. In a duplicate experiment, except for the omission of the hydroxyl-containing poly(titanyl stearate), substantially complete settling of the carbon black occurred after standing 4 hrs. at room temperature.

The hydroxyl-containing polymeric titanium carboxylates are also useful as fabric treating agents to impart water-repellency. This use is illustrated below:

Five and seven-tenths parts of paraffin wax and 0.3 part of polymeric hydroxyl titanium distearate were dissolved in 200 parts of Stoddard solvent. Undyed cotton sateen fabric was padded with this solution and passed through squeeze rolls under pressure so that the weight in the wet state was about twice the dry weight. The treated fabric was dried in air and then heated 10 minutes at 120° C. The fabric was colored white, had a soft hand, and had a spray rating of 100. In a control experiment a 3% solution of paraffin wax in Stoddard solvent was applied to undyed sateen in the same manner as described above. The treated fabric was white and had a soft hand. After heating 10 minutes at 120° C., the fabric had a spray rating of 80+, which indicated that its water repellency was less than that of the finish which contained the polymeric hydroxy titanyl stearate. A fabric with good repellency was obtained when a polymeric hydroxyl-containing titanium sesquistearate was substituted for the polymeric hydroxy titanium distearate. Solutions of titanium stearates and paraffin wax in Stoddard solvent were readily prepared and quite stable on storage.

In addition to the above illustrated uses, the products of this invention are useful as rust inhibitors for metals, anti-sludging agents for automotive oils, etc.

The preferred polymeric hydroxyl-containing titanium carboxylates are the mono- and sesquicarboxylates and compositions intermediate between these because of the ease with which they are prepared and because of their satisfactory solubility characteristics in hydrocarbons and other common organic solvents.

I claim as my invention:

1. A method for producing an organo-soluble polymeric hydroxyl-containing titanium carboxylate which comprises reacting a titanium tetrahalide, an aliphatic monocarboxylic acid containing from 8 to 20 carbon atoms, and at least 1 mol of water per mol of said titanium tetrahalide reactant, and thereafter recovering the polymeric hydroxyl-containing carboxylate.

2. A method for producing an organo-soluble polymeric hydroxyl-containing titanium carboxylate comprising reacting a titanium tetrahalide, an aliphatic monocarboxylic acid containing from 8 to 20 carbon atoms and from 1–2 mols of water per mol of said titanium tetrahalide reactant, and thereafter recovering the polymeric hydroxyl-containing carboxylate.

3. A method for producing an organo-soluble polymeric hydroxyl-containing titanium carboxylate comprising reacting titanium tetrachloride, an aliphatic monocarboxylic acid containing from 8 to 20 carbon atoms, and at least 1 mol of water per mol of said titanium tetrachloride reactant, and thereafter recovering the polymeric hydroxyl-containing carboxylate.

4. A method for producing an organo-soluble polymeric hydroxyl-containing titanium carboxylate comprising reacting titanium tetrachloride, an aliphatic monocarboxylic acid containing from 8 to 20 carbon atoms, and from 1–2 mols of water per mol of the titanium tetrachloride reactant, and thereafter recovering the polymeric hydroxyl-containing carboxylate.

5. A method for producing an organo-soluble polymeric hydroxyl-containing titanium carboxylate comprising reacting titanium tetrachloride with an aliphatic monocarboxylic acid containing from 8 to 20 carbon atoms, hydrolyzing the resulting product with from 1–2 mols of water per mol of the titanium tetrachloride reactant, and thereafter recovering the polymeric hydroxyl-containing carboxylate.

6. A method for preparing a hydrocarbon-soluble polymeric hydroxyl-containing titanium carboxylate which comprises reacting titanium tetrachloride, stearic acid, and from 1–2 mols of water per mol of said TiCl₄ in the presence of an acid acceptor, and thereafter recovering the polymeric hydroxyl-containing carboxylate.

7. A method for preparing a hydrocarbon-soluble polymeric hydroxyl-containing titanium carboxylate which comprises reacting titanium tetrachloride, lauric acid, and from 1–2 mols of water per mol of said TiCl₄ in the presence of an acid acceptor, and thereafter recovering the polymeric hydroxyl-containing carboxylate.

8. As a new hydrolysis-resistant polymeric hydroxyl-containing titanium carboxylate, the reaction product of a titanium tetrahalide, an aliphatic monocarboxylic acid containing from 8–20 carbon atoms, and at least 1 mol of water per mol of the tetrahalide.

9. As a new hydrolysis-resistant polymeric hydroxyl-containing titanium carboxylate, the reaction product of titanium tetrachloride, an aliphatic monocarboxylic acid containing from 8–20 carbon atoms, and at least 1 mol of water per mol of the tetrachloride.

10. As a new hydrolysis-resistant polymeric hydroxyl-containing titanium carboxylate, the reaction product of titanium tetrachloride, an aliphatic monocarboxylic acid containing from 8–20 carbon atoms, and from 1–2 mols of water per mol of the tetrachloride reactant.

11. As a new hydrolysis-resistant polymeric hydroxyl-containing titanium carboxylate, the reaction product of titanium tetrachloride, stearic acid, and from 1–2 mols of water per mol of titanium tetrachloride.

12. As a new hydrolysis-resistant polymeric hydroxyl-containing titanium carboxylate, the reaction product of titanium tetrachloride, lauric acid, and from 1–2 mols of water per mol of titanium tetrachloride.

JOSEPH H. BALTHIS.

REFERENCES CITED

The following references are of record in the file of this patent:

UNITED STATES PATENTS

| Number | Name | Date |
|---|---|---|
| 2,489,651 | Langkammerer | Nov. 29, 1949 |

FOREIGN PATENTS

| Number | Country | Date |
|---|---|---|
| 578,888 | Great Britain | July 16, 1946 |